(12) United States Patent
Immordino, Jr. et al.

(10) Patent No.: US 8,673,071 B2
(45) Date of Patent: Mar. 18, 2014

(54) JOINT COMPOUND USING PREDISPERSED DEDUSTING AGENTS

(75) Inventors: Salvatore C. Immordino, Jr., Trevor, WI (US); Ronald E. Schenck, Valparaiso, IN (US); Charles Miller, McHenry, IL (US)

(73) Assignee: United States Gypsum Company, Chicago, IL (US)

( * ) Notice: Subject to any disclaimer, the term of this patent is extended or adjusted under 35 U.S.C. 154(b) by 1305 days.

(21) Appl. No.: 11/639,793

(22) Filed: Dec. 14, 2006

(65) Prior Publication Data

US 2008/0141909 A1 Jun. 19, 2008

(51) Int. Cl.
*C04B 11/00* (2006.01)

(52) U.S. Cl.
USPC .......................................... 106/778; 106/772

(58) Field of Classification Search
USPC ...................... 524/5; 106/778, 772, 781, 816; 52/742.13, 742.16
See application file for complete search history.

(56) References Cited

U.S. PATENT DOCUMENTS

| | | | |
|---|---|---|---|
| 3,650,785 A * | 3/1972 | Ball et al. ................. | 106/644 |
| 4,389,506 A | 6/1983 | Hassall | |
| 4,587,279 A | 5/1986 | Salyer et al. | |
| 5,147,722 A | 9/1992 | Koslow | |
| 5,994,440 A | 11/1999 | Staples | |
| 6,090,875 A | 7/2000 | Staples | |
| 6,355,099 B1 | 3/2002 | Immmordino et al. | |
| 6,358,309 B1 | 3/2002 | Langford | |
| 6,528,610 B1 | 3/2003 | Frouin et al. | |
| 6,673,144 B2 | 1/2004 | Immordino, Jr. et al. | |
| 6,676,746 B2 | 1/2004 | Langford | |
| 6,863,723 B2 | 3/2005 | Langford | |
| 2001/0011112 A1 * | 8/2001 | Langford .................. | 524/5 |
| 2002/0129744 A1 | 9/2002 | Immordino et al. | |
| 2003/0055179 A1 | 3/2003 | Ota et al. | |
| 2003/0066456 A1 | 4/2003 | Langford | |
| 2005/0032958 A1 | 2/2005 | Bauer et al. | |

FOREIGN PATENT DOCUMENTS

JP 63039934 2/1988

OTHER PUBLICATIONS

Tiarco Chemical. Octowax 321 Product Specification.*
Carbowax PEG 300E Polyethylene Glycol Technical Data Sheet. Dow Chemical Co., 2010.*
Carbowax Methoxypolyethylene Glycol 750 Technical Data Sheet. Dow Chemical Co., 2010.*
Carbowax Polyethylene Glycol 540 Blend Technical Data Sheet. Dow Chemical Co., 2010.*
Carbowax Polyethylene Glycol 1450 Technical Data Sheet. Dow Chemical Co., 2010.*

* cited by examiner

*Primary Examiner* — Carlos Barcena
(74) *Attorney, Agent, or Firm* — Greer, Burns & Crain, Ltd.; Pradip Sahu; Philip T. Petti

(57) ABSTRACT

This method relates to making a joint compound that includes predispersing a dedusting agent in water to make a predispersed dedusting agent. Dry components, including at least one filler, are combined to make a dry mixture. Process water is pumped into a vessel and the predispersed dedusting agent is introduced to the vessel. The dry mixture is then added to the vessel and all components are blended to make a homogeneous product.

12 Claims, No Drawings

JOINT COMPOUND USING PREDISPERSED DEDUSTING AGENTS

BACKGROUND OF THE INVENTION

This invention relates to a method of making low dusting joint compounds. More specifically, it relates to a method of more efficiently adding the dedusting agent to the product.

In the construction of buildings, one of the most common building elements is gypsum wallboard, often known as drywall or gypsum paneling, used in the construction of walls and/or ceilings. The board may be composed of any of a variety of materials, including but not limited to, cementitious materials such as, for example, cement or gypsum. The term "drywall" is used illustratively, but as one of ordinary skill will appreciate, includes a variety of products such as wallboard, fiberboard, glass-faced gypsum boards, cement board, and the like. Walls made from gypsum wallboard are traditionally constructed by affixing the panels to wood studs or metal framing, and treating the joints between adjoining panels with a specially prepared adhesive called a joint compound. A huge advantage of this system is the ability to cut the gypsum panels to custom sizes and shapes. Gypsum panels easily accommodate walls that are unusual in size and can be shaped around structural elements such as beams or pipes. The panels are generally cut with a mat knife to the desired shape, joined to a substrate, and then finished with a joint compound. The side edges of the drywall panels are tapered, thus allowing the joint compound to be applied to the seam, between adjoining panels, in such a way that a monolithic surface is created when finished. It is well known in the art that finishing a joint between boards involves three steps. First a thin layer of joint compound is applied to the boards over the joint, and a liquid-permeable paper or fiberglass tape is embedded into it. This step is commonly referred to as the embedding step. Next, a second coat of joint compound is applied over the embedded joint tape. This step is commonly referred to as the fill step. The second coat of joint compound typically extends approximately two inches beyond the edges of the joint tape. Finally a third coat of joint compound is applied over the first two coats, where the third coat typically extends even further out from the edges of the joint tape. Both the second and third coat may be subsequently lightly sanded upon drying. Joint compounds are also used to make repairs of defects, such as uneven surfaces, holes, depressions, gaps, dents, and other imperfections including those around electrical boxes, piping and duct work, as well as corners created by the intersection of drywall boards.

There are several categories of joint compounds. Drying type compounds cure through the evaporation of water, whereas setting type joint compounds chemically react with water during the curing process. Setting type joint compounds typically use calcium sulfate hemihydrate, also known as stucco or plaster of Paris, as a base. When water is added to the setting type powder, it reacts with the calcium sulfate hemihydrate via a hydration reaction to form an interlocking matrix of calcium sulfate dihydrate crystals. The interlocking crystal matrix gives the compound increased strength. The benefit of a setting type joint compound over a drying type is the overall strength of the finished joint, resulting in less shrinking and cracking, as well as an independence from having to wait for the joint compound to be completely dry prior to further finishing. Drying type joint compounds typically use calcium carbonate as a base and cure through drying. Drying type joint compounds have the advantage of ease of use, as they typically come in a ready mixed form, with water being added and mixed by the manufacturer. A third type of joint compound combines the setting action of a calcium sulfate hemihydrate based compound with the ease of use of a ready mixed compound. The properties of a ready mixed setting type joint compound are taught in U.S. Pat. No. 5,746,822, incorporated herein by reference.

Between coats of joint compound, and before the wall is decorated, it is necessary to sand the joint compound to even the surface. While doing so, the dust generated is generally very fine and tends to remain airborne, settling out only after long periods of time. This long residence time in the air allows it to travel long distances from the site of the wall. In a home repair, this fine dust is not confined to the area immediately adjacent to where the joint compound is being used, but is often found throughout the house, resulting in fine dust settling everywhere.

Liquid mineral oils are known to reduce dust in gypsum-based compositions. However, these additives have a number of drawbacks. When such liquids are mixed into the composition, they tend to migrate toward the surface of the gypsum product, giving an uneven distribution of dust reducing properties. Whereas dust reduction may be acceptable when friction is applied to the surface of the product, the hardened product may have very different properties when finishing extends into the product interior. This may cause the product to dry unevenly as well. Buildup of oils at the product surface may inhibit passage of water vapor from the interior of the product. Oil and liquid waxes also cause the loss of adhesion to the substrate at higher concentrations.

Solid waxes have also been used to reduce the amount of gypsum fines generated by sanding or abrading of gypsum surfaces. Choice of a solid wax was made to overcome the problems with liquid compounds and so that the wax could be conveniently added with the solid components during wallboard manufacture. However, the use of high molecular weight solid waxes alone results in unsatisfactory dust retrieval during cutting of gypsum panels using hand-held tools. While not wishing to be bound by theory, it is believed that there is less friction generated by a hand-held mat knife compared to a power tool, thereby limiting the amount of heat available to melt the wax and agglomerate the fines.

Although some synthetic waxes are water soluble, they are not necessarily easy to solubilize. Some synthetic waxes are in the form of very fine powders that are difficult to wet, and once wet, dissolve very slowly. When added to the slurry water with other solid components, the solid synthetic waxes tend to float on the surface for a long time, dissolving slowly after prolonged mixing.

Even use of soft solid waxes poses problems. Materials that are too soft cannot easily be fed through the dry additive system with other solid additives. Polyethylene glycol ("PEG") having a molecular weight of 750 Daltons is a soft solid synthetic wax that is known to clog the transfer equipment in a dry additive system. Although PEG 750 is an excellent dedusting agent, adding it to a joint compound composition from the dry additive system is unsatisfactory. Modification of the manufacturing process to add the soft solid directly to the process water even fails to solve the problem under some conditions. Although synthetic waxes are water soluble, they take a long time to liquefy under plant conditions. In a manufacturing plant in the northern part of the United States in December, temperatures can average below 50° F. (10° C.). At these temperatures, PEG 750 can take up to 5 days to melt and dissolve by mixing in water.

Melting the soft solid to form a liquid also fails to alleviate all of the problems described above. It is difficult to maintain constant temperatures in large manufacturing facilities due to high ceilings, large volumes and constant opening and closing of doors or loading facilities. Where, as with PEG 750, the melting temperature is close to room temperature, once the soft solid is melted, the room temperature may drop below the freezing point of the dedusting agent, causing it to harden again. Heat may have to be constantly applied to the PEG 750 to keep it in a liquid form or it may need to be melted multiple times as temperatures vary. In either case, energy is used in many climates to keep the dedusting agent in the liquid form.

There is, therefore, a need for an improved method of adding soft solid dedusting agents to a slurry that allows for dispersing of the dedusting agent in a reasonable time. There is a further need for a method of making a joint compound slurry with a dedusting agent that is economically manufactured at low temperatures.

SUMMARY OF THE INVENTION

These and other needs are met or exceeded by the present invention that provides an improved method of making a slurry that allows the slurry to be prepared economically in unheated plants during colder weather.

More specifically, this invention relates to a method of making a joint compound that includes predispersing a dedusting agent in water to make a predispersed dedusting agent. Dry components, including at least one filler, are combined to make a dry mixture. Process water is pumped into a vessel and the predispersed dedusting agent is introduced to the vessel. The dry mixture is then added to the vessel and all components are blended to make a homogeneous product.

Use of a predispersed dedusting agent prevents clogging of the dry additive system when soft solid dedusting agents are used. Presolubilizing the dedusting agent puts it into a liquid form, making it unnecessary to use the dry additive system for this component at all.

The predispersed form of the dedusting agent also greatly reduces the time required to liquefy the dedusting agent and blend it with the other joint compound components. The time-consuming steps of melting, wetting and solubilizing the dedusting agent are carried out prior to formation of the joint compound, perhaps in a different facility. In many manufacturing facilities, raw material storage is not climate controlled. Resolidification of the dedusting agent due to temperature variations would have considerably less effect since the predispersed material remains liquid at lower temperatures. In many climates, solidification of the predispersed dedusting agent may be overcome completely.

Even if the predispersed dedusting agent solidifies, much less energy is needed to liquefy this material. The addition of water also reduces the viscosity of the dedusting agent so that, even when cooled below the melting point, it may still be pumpable.

DETAILED DESCRIPTION OF THE INVENTION

A low dusting joint compound is made up of a filler, a binder, a thickener and a dedusting agent that is at least slightly soluble in water and forms a hard solid at room temperature. The dedusting agent includes a dedusting agent that is predispersed in water prior to addition to a joint compound composition.

Types and amounts of filler vary depending if a setting type or drying joint compound is being made. When the joint compound to be made is a drying type formulation, the amount of filler varies from about 50% to about 98%. The preferred filler is calcium carbonate in amounts of from about 65% to about 93% by weight of the dry mix for a drying type. Gypsum, or calcium sulfate dihydrate, is also useful as filler in drying type joint compounds. Calcined gypsum, preferred filler for setting type formulas, is used in any suitable amount. Preferably, the calcined gypsum is present in an amount ranging from about 50% to about 93% by weight of the dry composition, more preferably, from about 55% to about 75% by weight of the dry composition. A setting type joint compound could be based on either an alpha or beta type calcium sulfate hemihydrate. In addition to the calcined gypsum, calcium carbonate may be used in amounts of from about 0% to about 30% by weight of the dry mix for a setting type joint compound.

Additional fillers are also used to impart specific properties to the joint compounds. Mica, talc, diatomaceous earth, clays, such as attapulgite, sepiolite and kaolin, calcium sulfate dihydrate, calcium sulfate anhydrite, and pyrophylite are also suitable. Mica aids in reduced cracking of the joint compound as it dries, and is preferred in amounts of up to 25%. It is also preferred to add clay in amounts of up to about 10% to improve the body and workability of the joint compound, and as a rheology modifier. Carbonates are preferably added to setting type joint compounds, as well as being the preferred filler in a drying type joint compound as a bulking agent. The ratio of all fillers to all binders is preferably in the range of from about 15:1 to about 5:1.

Perlite or expanded perlite is a lightweight filler that may be used where the weight of the compound is important. Use of expanded perlite in a lightweight joint compound is taught in U.S. Pat. No. 4,454,267, which is herein incorporated by reference. Expanded perlite is a very lightweight material that contains many cracks and fissures. It can be treated according to the teachings of U.S. Pat. No. 4,525,388, which is hereby incorporated by reference, so that the material does not increase in weight due to water absorbed by capillary action. The treated, expanded perlite, when used, is preferably present in concentrations of at least 5% based on the weight of all ingredients of the joint compound, excluding water.

The joint compound of the present invention optionally includes resin microspheres as one of the fillers to be used in place of or in addition to expanded perlite in lightweight formulations. Preferred shell resins suitable for use in the present invention are homopolymers, copolymers, or blends of homopolymers and/or copolymers formed one or more of acrylonitrile ("ACN"), vinylidene chloride ("VDC"), or methyl methacylate ("MMA") monomers. Particularly preferred resins are polyacrylonitrile ("PACN"), polyvinylidene chloride ("PVDC"), copolymers formed from ACN and VDC, and copolymers found from ACN, VDC, and MMA. The microspheres demonstrate high resiliency to compression without collapse (non-friable) and are able to withstand the exerted shear stress (shear-stability) of a typical joint treatment manufacturing process and subsequent customer preparation.

Any binder that is suitable for use in a joint compound is appropriate for use in the present invention. The binder is used to enhance the adhesion of the joint compound to its substrate, typically drywall. Acceptable binders include, but are not limited to latex emulsions or spray dried powders; including polyvinyl acetates, polyvinylacrylics and ethylene vinyl acetate latices; and dispersible powders such as polyvinyl acetates, polyvinyl alcohols, polyvinyl acrylics, ethylene vinyl acetates, vinyl chlorides, styrene acrylics and starches, or combinations (blends and/or copolymers) thereof.

Preferred binders are soft and pliable rather than being extremely hard. Hard binders are likely to create more fine dust particles compared to pliable polymers. Latex binders are most preferred in the present invention. The concentration of binder in a typical joint compound ranges from 1% to about 8% of the dry weight. In the present invention, the concentration of the latex binder ranges from about 1% to about 6.0%.

Bonding between the joint compound and the substrate is improved by the addition of thickeners, plasticizers and/or polyvinyl alcohol powder. Cellulosic thickeners are preferred, with METHOCEL® 240S providing the best results. Conventional cellulosic thickeners, such as ethylhydroxy ethylcellulose, hydroxypropyl methylcellulose, methylhydoxypropyl cellulose and hydroxyethyl cellulose, are also suitable in the joint compounds of this invention. The concentration of cellulosic thickener ranges from about 0.05% to about 2% of the dry weight of the joint compound ingredients.

Another component of the joint compound is the dedusting agent. The dedusting agent is selected to soften or melt when friction is applied, such as when the joint compound product is sanded, cut, machined or abraded. Dust generated by the finishing process is agglomerated by the softened or liquid dedusting agent. As the agglomerated fines fall away from the gypsum product, the dedusting agent hardens to hold the dust securely.

In some embodiments, the dedusting agent is a blended wax having a wide range of melting temperatures. The range should be wide enough that the wax melts to agglomerate fines when hand tools are applied, yet is sufficiently solid for use in the solid feed system without clogging it. A median melting temperature higher than about 75° F. (24° C.), but less than about 150° F. (65.5° C.). Commercially available waxes are preferred to save the expense of custom blends.

The wide molecular weight range is obtainable by blending waxes and/or blends of waxes having varying molecular weights. Waxes, such as MPEG 750 LD (Clariant Intl. Ltd., Muttenz, Switzerland) Methoxypropylene glycol 750 have a target median molecular weight range of, for example, about 715 Daltons to about 785 Daltons. The molecular weight range, and thus the melting point profile of the dedusting agent is expanded by blending of waxes. The melting point profile is sufficiently broad to allow the dedusting agent to soften when friction is applied to the gypsum product to sand, cut or abrade it, thereby agglomerating dust particles before they become airborne.

One method of expanding the melting point of the dedusting agent is by the addition of a second, harder dedusting agent to the first dedusting agent described above. A preferred second, hard solid dedusting agent has a melting point profile of about 80° F. (27° C.) to about 110° F. (43° C.) and more preferably from about 80° F. (27° C.) to about 89.6° F. (32° C.), but other profiles are possible if the dedusting agent melts when friction is applied then hardens to agglomerate the generated fines. For example, when MPEG 750 LD is used, in many embodiments it is preferable to add a higher molecular weight material, such as PEG 1500 PS. Preferred higher molecular weight polyethylene glycols have melting points of from about 107.6° F. (42° C.) to about 114.8° F. (46° C.). The dedusting components are optionally solubilized together to for the predispersed dedusting agent. Where two or more dedusting agents are solubilized together, preferably the solubilized dedusting agent includes at least 50% of the first dedusting agent. More preferably, the solubilized dedusting agent includes at least 70% of the first dedusting agent. These concentrations are based on the total weight of the dedusting agents.

The melting point profile is customizable for particular products that are finished in different ways. A machinable plaster that is cut, sanded or routed with power tools is selected to melt at higher temperatures since a great deal of friction is generated. Joint compounds that are frequently sanded by hand have an optimum melting point profile that has a lower median melting temperature. The relatively low friction of cutting a gypsum board by hand preferably has a lower melting point profile than the example above. The optimum melting point profile for a particular product depends on the harness and density of the matrix formed the use to which it will be put.

Synthetic waxes, such as water soluble linear polymers formed by the addition reaction of ethylene oxide and/or alkoxy-substituted ethylene oxide with water, are preferred dedusting agents. Any of these additives can be used to control the surface absorption properties of the cured joint compound. Polyethylene glycol ("PEG"), methoxypolyethylene glycol ("MPEG"), polyethylene glycol, or combinations thereof are most preferred. These additives also improve the wetness and slip of the material. Suitable compounds are in a solid form at room temperature and are at least slightly soluble in water. Preferably, the powder form of the synthetic wax is soluble in water at 20° C. to at least 10 wt %.

The dedusting agent is added in any suitable amount. Preferably, it is present in a concentration ranging from about 0.1% to 8% of the dry weight of the joint compound. In another preferred range, it is added at concentrations between about 0.1% and about 6%, and most preferably between about 0.5% and about 4.0%. When the solid dedusting agent is supplied in the form of a suspension in water, only the dry solids are considered when calculating the amount of dedusting agent to be used. The amount of the dedusting agent is chosen based on the amount of dust to be generated during sanding.

The dedusting agent is predispersed in water prior to its addition to the joint compound. Use of the term "dispersing" is also intended to include dissolving or solubilizing of the dedusting agent. Where a dispersion is formed, as compared to a true solution of the dedusting agent, the dispersion is formed with a surfactant capable of holding the dedusting agent dispersed until the joint compound has become sufficiently firm to prevent migration of the surfactant or dedusting agent to the surface of the product. Migration is known to cause problems with bonding of the dried surface of the joint compound with paint or other decorative coverings. When used, paraffins are dispersed in water with surfactants. Care is used in selecting the surfactant to maintain the dispersion for an appropriate period of time.

More preferably, the dedusting agent is dissolved or solubilized in water rather than dispersed with surfactants. The amount of water used is preferably as little as possible to form a pumpable slurry. This minimizes the cost of storing and transporting large volumes of the solubilized dedusting agent. Lower temperatures are likely to require more water to make a pumpable slurry and it is anticipated that the amount of water will vary depending on the temperature at the facility where the predispersed dedusting agent will be used.

After selecting the dedusting agent, it is dispersed in water. The appropriate amount of dedusting agent is added to water and mixed until blended. Optionally, the mixture is heated to a liquid state to aid in dispersing of the dedusting agent. Preferably the dedusting agent is dissolved or solubilized in the water to reduce the possibility that a surfactant-based dispersion will break down prior to the drying of the product. Preferably the dispersed dedusting agent is prepared in a location other than the joint compound manufacturing facility where it will be used, so that temperatures can be controlled more precisely. The dispersed dedusting agent is then transported to the facility where it will be used.

It is also contemplated that the predispersed dedusting agent be used with a solid dedusting agent where they are added separately to the joint compound slurry. The predispersed dedusting agent is preferably added to the slurry, either combined with the process water or via a separate line. Preferably, the solid dedusting agent is added with the other dry ingredients.

Joint compounds are available in either dry mix forms, or in wet, ready-mix form with the water added during manufacture. For the purposes of this invention, the predispersed dedusting agent is added to the batch mix water followed by the dry ingredients. Water is added to the dry ingredients, either during manufacture or immediately prior to use, in an amount to obtain the desired consistency. Preferably water is present in the slurry in an amount ranging from about 14% to about 75% by weight of the wet composition, more preferably, in an amount ranging from about 23% to about 55% by weight of the wet composition.

Thickening agents are also added to the joint compound of the present invention. After water is added to the composition, the thickener becomes hydrated and swells, thereby thickening the composition. Thickeners are useful, for example, in helping to create the body and flow properties commonly associated with joint compounds. Desirably, the thickener is selected so that is substantially hydrates during the mixing process after water is added to the composition, with little or no hydration of the thickener occurring after mixing is completed, to prevent formation of lumps in the joint compound.

Suitable thickening agents include hydroxypropylmethylcellulose, hydroxyethylcellulose, cellulose-based gums, such as xanthan, Arabic, alginate, pectin and guar gums, either alone or in combination. A preferred thickener is Methocel 240S. The thickening agent can be provided in any suitable amount. Preferably, it is present in an amount of from about 0.1% to about 2.0%, and more preferably, from about 0.1% to about 1.0% of the dry composition.

Set control additives or chelating agents are also added to setting type formulations to control set initiation or rate during the shelf life and use of the product. Preferred set control additives include, but are not limited to potassium sulfate, calcium sulfate; aluminum sulfate, boric acid, sodium citrate, citric acid, tartrates, or proteineacious materials, or the like, and combinations thereof. Those skilled in the art will recognize that the choice of set control additive and the concentration depends on the desired hydration time and hydration rate.

When the setting type, ready mix joint is to be applied to a joint, a catalyst is used to overcome the set control additive and initiate the hydration reactions. Preferably, a zinc salt catalyst is used, such as that taught in U.S. Pat. No. 5,746,822, which is herein incorporated by reference. If a setting type, ready-mix joint compound is utilized without the catalyst, it functions as a drying type joint compound.

The use of a trimetaphosphate ion is also contemplated for use with this invention. Setting type joint compounds utilizing trimetaphosphate ions have enhanced green strength, final strength or both. However, since the trimethaphosphate ion is unstable at high pH, it is preferable to maintain the pH below 9 in compositions where trimetaphosphate ions are used. Use of trimetaphosphate salts in joint compounds is disclosed in U.S. Ser. No. 09/718,279, filed Nov. 22, 2000, herein incorporated by reference.

The joint compound is made by predispersing the dedusting agent in water as described above to form a predispersed dedusting agent. The dedusting agent is heated to a liquid form and either dissolved or dispersed in the water. Combining two or more commercially available waxes is a preferred way of broadening the melting point profile of the predispersed dedusting agent.

Dry components of the joint compound are measured and added to the dry component feed system. A preferred method of combining the dry components is by moving the filler by conveyor and dropping additional dry components on the moving filler. Another preferred method is feeding the dry component materials using a bag dump. An artisan of joint compounds will be familiar with both of these feed techniques.

Process or make-up water is pumped into a vessel. The predispersed dedusting agent is added to the vessel, either in the process water or through a separate line to the vessel. If added via a dedicated line, the position in the vessel for adding the predispersed dedusting agent should be selected so that there is little or no direct contact of the predispersed dedusting agent with the dry ingredients.

The dry components of the joint compound are added to the vessel and all components are blended until a homogenous joint compound slurry results. The slurry is generally packaged as a ready-mix joint compound.

Example 1

Several dispersions of PEG M 750 in water were prepared to determine the properties of each dispersion. In each case, the PEG M 750 was heated until it was melted, then added to water and mixed until it was fully dissolved. Table I shows the temperatures at which each of the samples remained liquid.

TABLE I

| Sample | PEG M 750 | Temperature at which paste formed |
|---|---|---|
| A | 100% | 75° F. (23.9° C.) |
| B | 95% | 65° F. (18.3° C.) |
| C | 90% | 55° F. (12.8° C.) |
| D | 85% | 54° F. (12.2° C.) |
| E | 80% | 46° F. (7.8° C.) |

This data show the decrease in freezing temperature of the PEG M 750 when it is predispersed in water. Low freezing temperatures result in manufacturing savings because less energy needs to be expended to liquefy the dedusting additive.

Example 2

Two hundred gram samples were obtained of each of Sample A and Sample E from Example 1. Sample A was initially a solid at room temperature, while Sample E was a liquid. The samples were placed in an environmental chamber at 113° F. (45° C.). The pure PEG M 750 of Sample A required 185 minutes to liquefy, while the predispersed solution of 80% PEG was already liquefied.

Example 3

Drying type joint compounds were formulated using several forms of polyethylene glycols to compare the dedusting performance. Compositions of three joint compounds are shown in Table II. All percentages are calculated on a weight basis. Fillers used included Snowhite Filler calcium carbonate (J.M. Huber Corp., Edison, N.J.), and Talcron 45-26, (Minerals Technologies, Inc., New York, N.Y.). Expanded perlite (Silbrico 35-34, Silbrico Corp., Hodgkins, Ill.) was used as a lightweight filler. Gel B (Zemex Industrial Minerals, Inc. Atlanta, Ga.) is a finely ground attapulgite clay. Aqua-D 3916 is a Modified Cellulose Ether thickener. Fungitrol 158 is a fungicide made by Huls America, Inc. which may be added to the joint compound. Troysan 174 is a preservative made by the Troy Chemical Company which is used for in-can preservation of the ready mixed joint compound. A polyvinyl acetate latex (Halltech 41-355) was used as a binder. These components were common to all samples.

Each sample also included synthetic waxes in at least two molecular weight ranges. Approximately 80% by weight of the synthetic wax was a low-melting polyethylene glycol having an average molecular weight of 750 Daltons. The remaining 20% of the synthetic wax was a higher melting polyethylene with an average molecular weight of 1500 Daltons. Sample 8560A included PEG 1500 PS, a hard solid that was added to the mixer with the fillers, perlite, clay and thickener. PEG M750 was a soft solid. It was warmed in an oven until it liquefied, then added with the water, latex binder, preservatives and any other liquid components. Sample 8560B used 750A, a soft solid blend of PEG 750 and PEG 1500. It was firmer than the PEG 750 alone, but not hard enough to add to the dry component system. This blend was also heated in an oven until melted, then added to the process water. PEG 750 Blend, a pre-dispersed blend of PEG M 750 and PEG 1500 PS, was made for addition to sample 8560C. The synthetic wax was blended with water in an 80/20 ratio until the waxes were dissolved in the water. In Table II below, the amount of PEG 750 Blend that was used is greater to account for the presence of the water. In each of the samples, the amount of synthetic wax on a weight basis was about 3%.

TABLE II

|  | Sample | | |
| --- | --- | --- | --- |
|  | 8560A | 8560B | 8560C |
| Calcium Carbonate | 72.11% | 71.58% | 71.58% |
| Silbrico 35-34 | 10.65% | 10.57% | 10.57% |
| Gel B | 4.00% | 3.97% | 3.97% |
| Talcron 45-26 | 3.50% | 3.47% | 3.47% |
| Aqua-D 3916 | 0.90% | 0.89% | 0.89% |
| Halltech HP41-355/830 | 5.63% | 5.59% | 5.59% |
| Troysan 174 | 0.10% | 0.10% | 0.10% |
| Fungitrol 158 | 0.10% | 0.10% | 0.10% |
| PEG M750 | 2.35% | 0 | 0 |
| PEG 1500 PS | 0.66% | 0 | 0 |
| PEG 750A | 0 | 2.98% | 0 |
| PEG 750 Blend | 0 | 0 | 3.73% |
| Water, lbs (kg) | 680.0 (309) | 680.0 (309) | 680.0 (309) |
| Total Batch Weight, lbs. (kg) | 1679.8 (763.6) | 1679.8 (763.6) | 1687.3 (766.9) |

Joint compounds were made by combining the dry components of each of the compositions listed above, followed by the fillers, clay, perlite, thickener and other solid, dry ingredients. PEG 1500 PS was added to the dry components in sample 8560A as well. Liquid or soft solid components, including the latex binder, preservatives and other synthetic waxes, were added with the process water and mixed until blended. The dry components were then added to the mixer and blended until a uniform slurry was obtained.

In addition, fragments of each of the joint compounds were visually inspected to determine the propensity to form fine particles during sanding. Each of the joint compounds described in this example showed good abilities to reduce dust.

While a particular embodiment of the pre-solubilized wax blends for dust control have been shown and described, it will be appreciated by those skilled in the art that changes and modifications may be made thereto without departing from the invention in its broader aspects and as set forth in the following claims.

What is claimed is:

1. A method of making a joint compound comprising:
   a) selecting a dedusting agent which is a solid at room temperature but which liquefies under friction of sanding, cutting or abrading, wherein the dedusting agent is a water-soluble synthetic wax;
   b) obtaining a presolubilized dedusting agent with a decreased freezing temperature by heating the dedusting agent to a liquid form and either dissolving or dispersing the dedusting agent in water only;
   c) combining dry components, including at least one filler, to make a dry mixture;
   d) pumping process water into a vessel;
   e) introducing the presolubilized dedusting agent to the vessel;
   f) adding the dry mixture to the vessel; and
   g) blending the dry mixture, process water and presolubilized dedusting agent to make a homogeneous product, wherein at least one of steps c) through g) is performed at a temperature lower than room temperature.

2. The method of claim 1 further comprising transporting the presolubilized dedusting agent to a manufacturing facility prior to said first adding step and performing step e) of the method of claim 1 without reheating the presolubilized dedusting agent.

3. The method of claim 1 wherein the presolubilized dedusting agent is a blend of at least two polyethylene glycols, a first polyethylene glycol that is a soft solid having a melting point of from about 80.6° F. to about 89.6° F. and a second polyethylene glycol having a melting point above 89.6° F.

4. The method of claim 3 wherein the second polyethylene glycol has a melting point of about 107.6° F. to about 114.8° F.

5. The method of claim 3 wherein the presolubilized dedusting agent comprises at least 50% by weight of the first polyethylene glycol based on the total weight of the presolubilized dedusting agent.

6. The method of claim 5 wherein the presolubilized dedusting agent comprises at least 70% by weight of the first polyethylene glycol based on the total weight of the presolubilized dedusting agent.

7. The method of claim 1 wherein a second dedusting agent is added during said adding step with the dry mixture.

8. The method of claim 1, wherein the presolubilized dedusting agent remains pumpable at a temperature above 12.8° C.

9. The method of claim 1, wherein the presolubilized dedusting agent remains pumpable at a temperature above 12.2° C.

10. The method of claim 1, wherein the presolubilized dedusting agent remains pumpable at a temperature above 7.8° C.

11. A method of making a joint compound comprising:
   a) selecting a dedusting agent from the group consisting of a water-soluble linear polymer formed by the addition reaction of ethylene oxide and/or alkoxy-substituted ethylene oxide with water, polyethylene glycol, methoxypolyethylene glycol and combinations thereof;
   b) obtaining a presolubilized dedusting agent with a decreased freezing temperature by heating the dedusting agent to a liquid form and either dissolving or dispersing the dedusting agent in water only;
c) combining dry components, including at least one filler, to make a dry mixture;
d) pumping process water into a vessel;
e) introducing the presolubilized dedusting agent to the vessel;
f) adding the dry mixture to the vessel; and
g) blending the dry mixture, process water and presolubilized dedusting agent to make a homogeneous product, wherein at least one of steps c) through g) is performed at a temperature lower than room temperature.

12. The method of claim 11, wherein at least one of steps c) through g) is performed at a temperature higher than 7.8° C., but lower than 21° C.

* * * * *